July 31, 1962 A. SCHURE 3,046,675
COMPROMISE PROOF TEACHING DEVICE
Filed Nov. 16, 1960 3 Sheets-Sheet 1
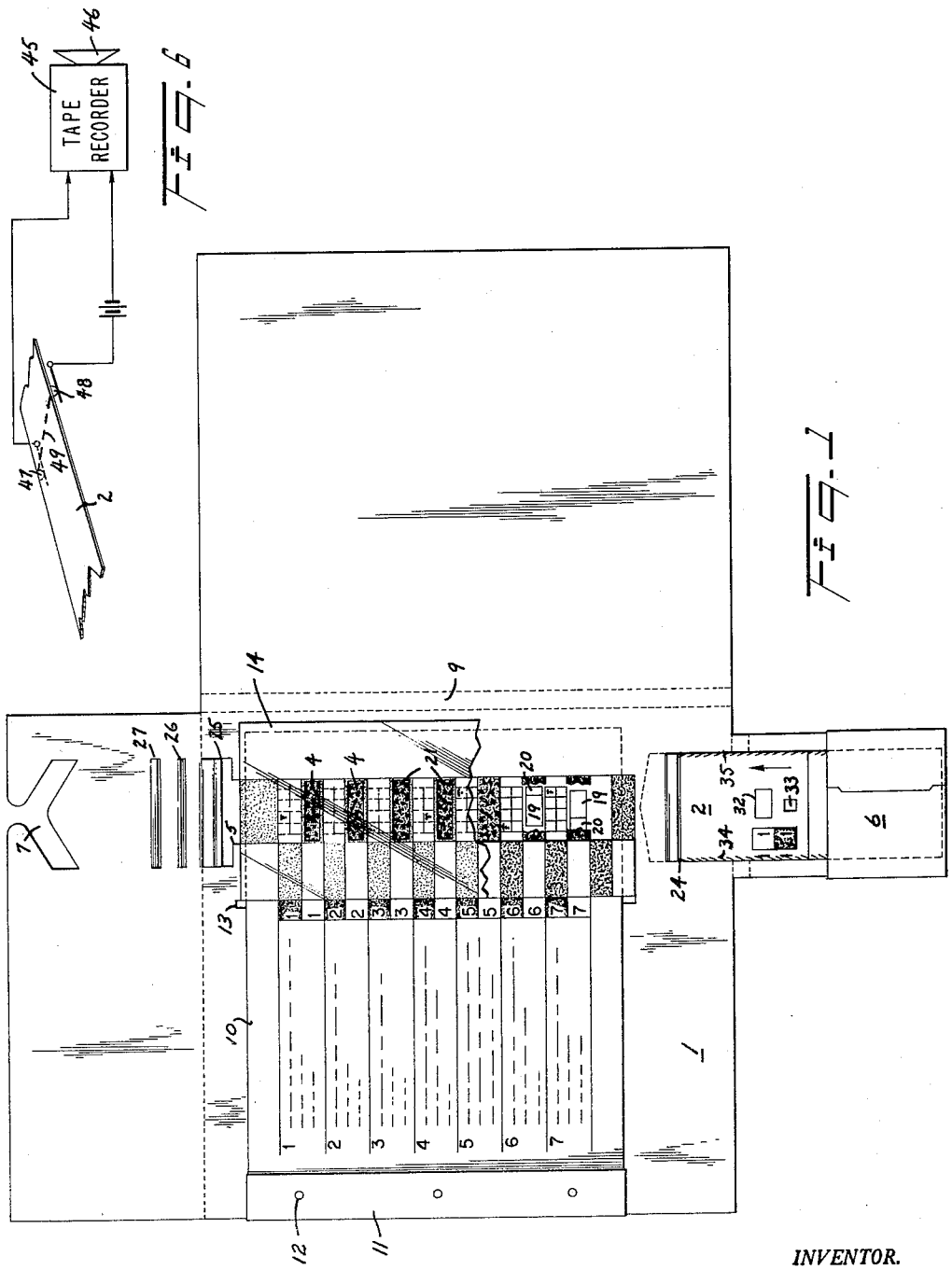
INVENTOR.
ALEXANDER SCHURE
BY
Roy C. Hopgood
ATTORNEY

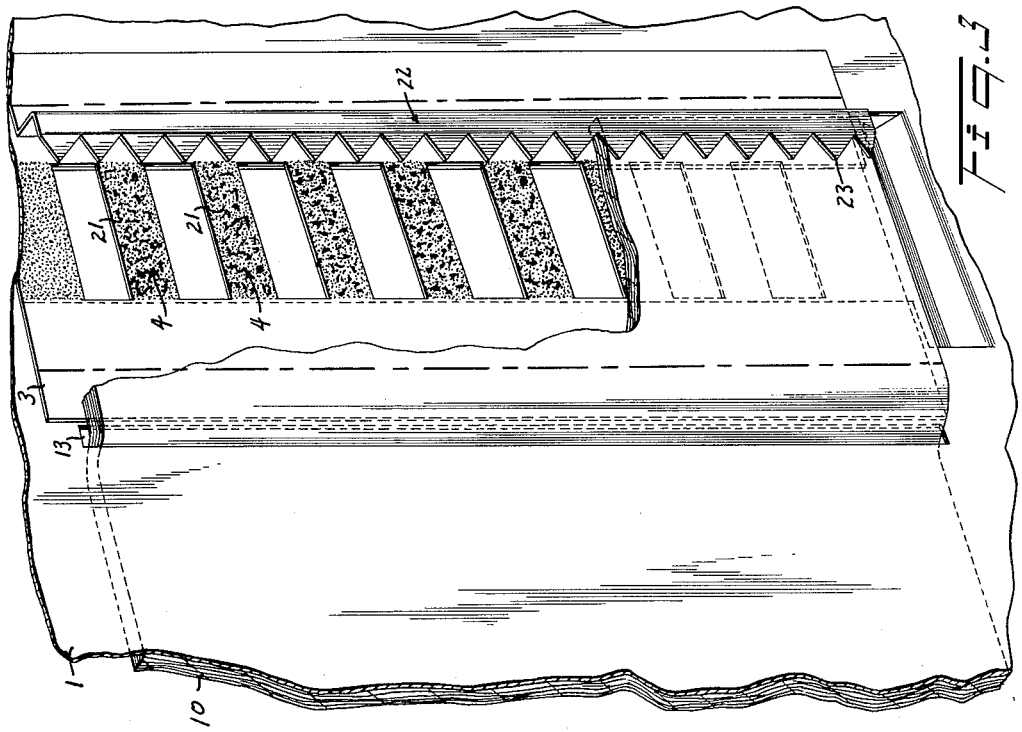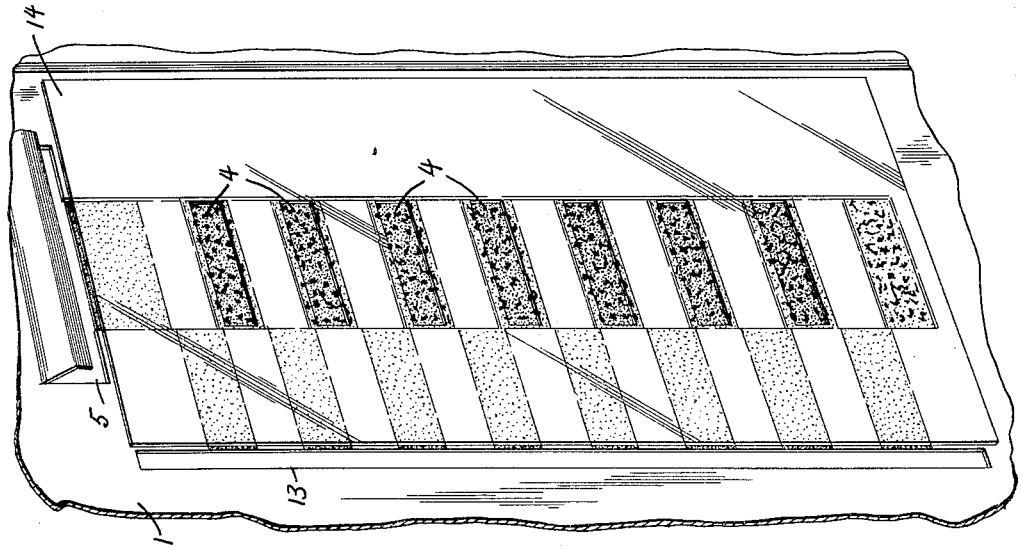

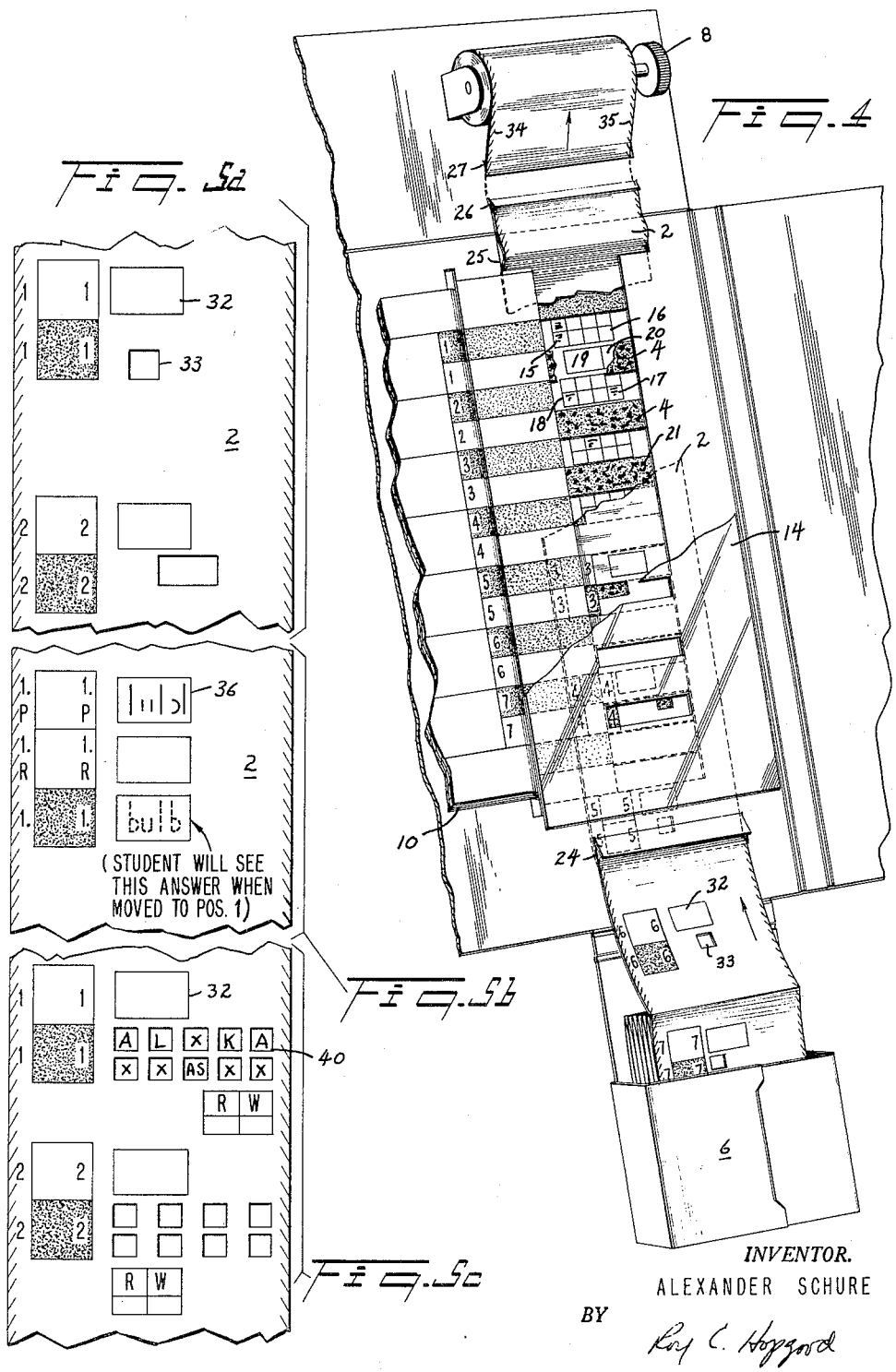

United States Patent Office 3,046,675
Patented July 31, 1962

3,046,675
COMPROMISE PROOF TEACHING DEVICE
Alexander Schure, Belle Harbor, N.Y., assignor, by mesne assignments, to Educational Aids Publishing Corp., Long Island, N.Y., a corporation of New York
Filed Nov. 16, 1960, Ser. No. 69,599
21 Claims. (Cl. 35—9)

This invention relates to a teaching machine or device, and more particularly to a compromise-proof teaching device which requires the student to write his answers to questions prior to obtaining the correct answers.

As has become known in recent years, there is a pressing need for a new technique in educational methods. The need is a result of the increasing population and the inadequacy of the present sources of teacher supply and school facilities. As a result of these pressures on the educational system and methods, considerable effort and money have been expended to improve the efficiency of the educational process.

Recently, teaching machines have become known which represent a new type of equipment in education. The teaching machines have made a dramatic impact upon the educational process and give promise of greatly increasing the efficiency of the educational process.

Teaching machines generally are devices which increase the teacher's control over learning activities within a class room. They are designed as a tool for the teacher. In this sense, they are analogous to books, radio, closed circuit television, motion pictures and other teaching devices. They present information as one of their prime functions.

The teaching machines, however, differ radically from other devices in that they continually measure and evaluate the students' responses to the educational content demanded by the machine. The machines are equipped to adjust this content in accordance with the need of the individual student working with the device. This technique is known as "feed-back."

Closed circuit television, motion pictures and better text books represent improved technological means of presenting information effectively. Thus, they serve one function of the teacher. When properly utilized, these technological devices make the materials sufficiently clear and motivating to allow the student to learn.

Teaching machines utilize the technical advantage of any media which permits economical dissemination of knowledge by presenting educational content through technological devices and by governing the learning process.

The major psychological principle from which the teaching advantages of the machine stem, is that of reinforcement. The relationship between the strengthening of learning behavior and reinforcement is termed "contingency of reinforcement." Contingencies of reinforcement form the basis of the learning process and require quick and almost immediate reward or guidance after a response has been made. There can be no "reward" for anything other than performance of the behavior that is being taught. Otherwise different and perhaps undesirable behavior or learning patterns would be reinforced. This could give rise to the wrong sort of performance or might not teach any sort of consistent performance at all. A large enough number of reinforcements must be provided to insure that the learner has reached his goal. This is particularly true in the early stages of learning; otherwise a lack of interest or failure to learn may result. These principles are the same that a good teacher or tutor utilizes in analyzing and rewarding the "acceptable" portions of a student's performance.

For obvious reasons, these procedures cannot be applied precisely in the average class room situation by the human teacher. While the traditional class room environment seems to be a convenient teaching-learning pattern, its very structure prevents it from being one of maximum efficiency.

In fact, the teaching machines are designed to give each student the effect of a personal tutor. In order to accomplish this tutorial rapport, the teaching machine must possess the following operating characteristics as minima:

The machines must present in a carefully planned order selected educational content offered one item at a time;

The machines must contain a method whereby the student can indicate his response to problems relating to the material presented; and The machine must give a direct and immediate indication of the correctness of the student's answers. The effect of the machine upon the student is much like that of a tutor. The machine, for example, requires assurance that the student understand the earlier part of a lesson which is graded in difficulty before he can proceed to the more complex parts of the lesson. The material content adjusts itself in accordance with the student's progress and needs. Many other advantages flow from the use of the machine which are known to administrators and educators.

Accordingly, it is a primary object of the invention to provide a structurally simple, inexpensive machine which is amenable to mass production techniques, whereby the machine may be manufactured at very low cost. The novel machine, therefore, is made available practically to the entire national student body.

It is a further object of the invention to make the novel teaching machine out of paper, plastic, cardboard or other inexpensive materials which, in effect, makes the machine dispensable and economically replaceable.

It is a further object of the invention to provide a machine which is compromise-proof, so that the student must answer questions in accordance with the programming of the machinne. That is, the machine positively prevents the student from observing the answer to a question prior to making the answer, and once having made his answer, the machine positively prevents the student from surreptitiously altering his answer after having seen the correct answer.

In accordance with a broad aspect of the invention, the teaching device comprises a program sheet attached to a backing, the program sheet containing stimuli on a first portion thereof and correct responses on a second portion spaced from the first portion. The student upon examining the stimuli indicates his response on a response sheet which is of sufficient width to cover the second portion of the program sheet. The response sheet is guided for movement over the second portion of the program sheet so as to prevent the student from detecting the correct responses which are contained on the second portion. The student's responses on the response sheet are transferred to the program sheet through a pressure sensitive transfer member located between the response sheet and the second portion of the program sheet. After having indicated his response, the student moves the response sheet to a predetermined position where he may observe the correct response through openings in the response sheet and transfer member.

In accordance with a more limited aspect of the invention, a cut-out is formed in the backing and the second portion of the program sheet is threaded through a slot in the backing to underlie the cut-out. The transfer member comprises a plurality of transfer strips extending across the cut-out portion in ladder-like distribution; the student, therefore, writes or indicates his response only on those portions of the response sheet which overlay the strips. A code is provided on the backing to indicate the precise location of the strips.

In accordance with still another aspect of the invention, the response sheet is provided with means for closing an electrical circuit to energize a recording or transcribing machine, or radio, or television, or other device for supplementing the programmed content.

The above mentioned and other features and objects of this invention and the manner of attaining them will become more apparent and the invention itself will be best understood by reference to the following description of an embodiment of the invention taken in conjunction with the accompanying drawing, wherein:

FIG. 1 illustrates the teaching device with certain transfer strips broken away and prior to the positioning of the response sheet;

FIG. 2 is a perspective view of a portion of the front side of the backing showing in enlarged detail the transfer mechanism, cut-away portion and codal area for indicating the location of the strips;

FIG. 3 is a perspective view of the rear side of the backing portion shown in FIG. 2 and including a pack of program sheets and buffer spring for retaining an end of the sheets under slight pressure;

FIG. 4 is a perspective view of a part of the backing, the codal area, transfer mechanism, response sheet, and slotted transparent member overlying the response sheet;

FIGS. 5A, 5B and 5C illustrate three different techniques respectively for coding the response sheet, to reveal the correct answer only when the response sheet is in a prescribed position; and FIG. 6 is a simplified diagrammatic illustration of an educational device operated by contact buttons on the response sheet.

Since a primary purpose of the novel teaching device is to present prompts, questions, stimuli and the like and to conceal the correct response or answer until predetermined conditions are fulfilled, an illustration of the assembled device would not be very informative. Accordingly, in the several figures, certain parts have been omitted or "broken away" for ease in following the description or in perceiving the invention from the illustrations. The basic components of the invention, however, have been clearly illustrated; for example, the novel teaching device comprises a backing 1 (FIG. 1), a response sheet or moving track 2 (FIGS. 2 and 5A–5C), a transfer element 3 preferably comprising a plurality of strips 4 (FIGS. 1–4), a window, channel or track 5 (FIGS. 1, 2), a response sheet distribution box 6 (FIGS. 1, 4) and provision for taking-up the response sheet, e.g., a winged-shaped slot 7 (FIG. 1) for holding accordion pleated paper or a unidirectional take-up roller 8 (FIG. 4).

Referring now to FIG. 1, the backing 1 is preferably rectangular in shape (with appendages thereto which will be described later), and is foldable about a line 9. The backing may be made of heavy weight paper, cardboard, plastic or other equivalent inexpensive, lightweight material.

A package of paper sheets 10, in the form of a printed or programmed booklet, is attached along one edge, e.g., edge 11 of the backing, by any suitable means, such as rivets 12. The format of the printed material on these sheets will be discussed later in the application.

The backing 1 is formed with the window or track 5, which is simply a cut-out portion. The window is elongated in the top-to-bottom dimension of the backing.

The backing is also provided with a slot 13, through which the programmed sheets pass to the underside of the backing, as shown in FIGS. 1 and 3.

The programmed sheets comprise a first portion of prompts, stimuli or questions arranged in sections and numbered, for example, 1 to 7 (FIG. 1). Each stimulus requires a response by the student. A second portion of the programmed sheet comprises the correct responses for the respective stimuli and a box or area for the student to indicate his response. As best seen in FIG. 4, a correct response is shown in a square 15 of a divided rectangle 16, and square 17 of rectangle 18; the other rectangles similarly contain the correct responses, and preferably in different squares as will be explained later. Below each rectangle, an area or box 19 (FIGS. 1, 4) is provided wherein the student's response is indicated. If desired, the box 19 may include an area 20 wherein the student indicates whether his answer is "Right" or "Wrong." The correct responses and areas for the student's responses are, of course, aligned with the related stimuli respectively.

When the programmed sheets are attached to the backing and threaded through the slot 13, the second portion thereof containing the correct responses and areas for the student's responses are located under the window 5.

In accordance with an aspect of the invention, the student does not write directly on the programmed sheet, but rather on the response sheet 2 and his answers are transferred through the member 3 to the second portion of the programmed sheet. This method for indicating a response constitutes a first means for minimizing the possibility of the student compromising his integrity during the performance of the examination.

The transfer member 3, as best seen in FIG. 3, preferably comprises a sheet of material such as stiff paper, thin cardboard, plastic, or the like, slotted regularly and uniformly from top to bottom in the sense of the programmed sheets. The strips 4, above and below the slots, define a ladder-like structure. The marginal sides of the sheet 3, on opposite sides of the strips 4, are free of the backing for a given distance to define a channel therewith, and then sealed by cement or other adhesive to the backing. In FIG. 3, the channel is suggested by dot and dash lines, and in FIG. 4, the response sheet 2 is shown positioned in the channel.

The strips 4, which as shown in FIGS. 1 and 4 are located to overlie the response boxes 19, are treated with a transfer substance 21, such as carbon paper ink or the like. Preferably, although not necessarily, both sides of the ladder strips are treated with the transfer material to make the novel teaching device even more compromise-proof, as will be explained shortly.

The programmed sheets are retained under pressure against the window by a buffer spring 22 (FIG. 3). The buffer spring is attached to the underside of the backing or ladder sheet and is formed with a springy section 23 which bears against the ends of the sheets 10. In a preferred embodiment the spring 22 is formed from an end of the ladder sheet by folding the end on itself for a given distance, then at right angles thereto for a distance to accommodate the thickness of a full package of sheets 10, and then in the direction of the sheets but inclined towards the backing to apply pressure against the sheets. If desired, the spring portion may be sprayed with a stiffening material, or may be pretensioned by means of a metal clip (not shown). Thus, in the assembled position, the sheets are attached at one end to the backing, and retained at the other end by the spring 22.

As previously mentioned, the student's responses are indicated on the response sheet 2 which is best seen in FIGS. 4 and 5A–5C. The response sheet is an elongated piece of paper, folded or otherwise retained in the container or box 6. Preferably, the paper is accordion pleated in the box 6 and is simply removed by unfolding from the box, the bottom end of the sheet being fastened to the box.

The response sheet is threaded through a slot 24 in the backing, through the channel between the backing and the ladder member (FIG. 4), out of slot 25, in and out of slots 26, 27, and taken-up either by folding and retaining within winged-shaped slot 7 (FIG. 1) or on take-up roller 8 (FIG. 4). The response sheet, therefore, covers completely the transfer strips 4. Accordingly, information is provided as to the location of the strips and instruction must be provided as to the sequence of operations to be performed by the student.

On the backing 1, a code is provided to indicate the location of the transfer strips 4. In the illustrated embodiments, stippled boxes indicate the slots between strips and the white boxes indicate the locations of the transfer strips (FIGS. 1, 4).

Additionally, the codal area on which the code is placed positionally correlates the questions on the programmed sheet 10 with the response areas on the response sheet 2. In the illustrated embodiment, on a portion intermediate the first and second portions of the program sheet, the code is shown alongside each question which permits alignment of the programmed sheet with the backing so that the correct responses and answer boxes are positioned exactly relative to the transfer strips. The student would, therefore, be instructed to observe the alignment of the programmed sheets and be certain that the stippled boxes on the sheets were aligned with the stippled boxes on the backing.

The response sheet is also provided with a complementary code of stippled and white boxes containing numbers corresponding to the numbered questions on the program sheets. For a response sheet as shown in FIG. 5A, the student would be instructed to align the white box numbered "1" alongside the same numbered white box on the program sheet, read the question, and indicate his response in the box 32. As will be apparent from FIGS. 4 and 5, the student's response would be transferred to the answer box 19 on the programmed sheet 10, and a mirror image of the response would be transferred to the underside of the response sheet 2.

After indicating his response, the student observes the correct response by moving the response sheet upwardly (in the sense of the programmed sheet) until the stippled boxes "1" are aligned. An aperture 33 will now be aligned with the correct response on the program sheet for the student's observation and reinforcement.

Several features which make the novel teaching device compromise-proof will now be described.

First, the student may not slip the programmed sheet out from behind the window to observe the correct response before indicating his response, for once having removed the sheet from under the spring 23, the spring pressure prevents reinsertion of the sheet thereunder.

Second, once having indicated his response on the response sheet, the student may not later surreptitiously change the answer because: A mirror image of the original answer appears on the underside of the response sheet and any attempt to alter the answer would cause disalignment between the new answer and the mirror image; further, the edges of the response sheet are fluted as shown at 34, 35, and/or a unidirectional take-up roller is provided to prevent the response sheet from being retracted once it has been moved to observe the correct response; still further, in the embodiment of FIG. 5A, the apertures 33 are so located that a correct response will not come into view during the traversal of the response sheet over the programmed sheet.

After answering question "1," the student would follow the same sequence in regard to the other questions and responses. In the embodiment of FIG. 5A, if the answer boxes "2" followed directly under the boxes numbered "1," all of the questions would require answering before movement of the response sheet. However, in the illustrated embodiment, the correct answer is observed immediately after the question is answered and prior to answering the next question.

In FIG. 5B, an alternative technique for preventing the student from observing the correct response during traversal of the response sheet is illustrated. In this embodiment, a third box 36 is required called a "prompt." While the prompt box is aligned with the corresponding numbered white box, i.e., over a transfer strip, the student is instructed to trace over the lines in the box. The underlying program sheet is provided with other complementary lines so that the correct answer on the program sheet is made intelligible only by the student's tracing over the apparent meaningless lines. For example, in FIG. 5B, after the student had traced over the lines in the prompt box 36, he would have transferred these lines necessary to complete the word "bulb" on the program sheet. The word "bulb" would be the correct response and would be seen only after the student moves the response sheet so that the stippled boxes are in alignment.

FIG. 5C illustrates still another technique for concealing the correct response during traversal of the response sheet. In this embodiment, a series of random letters and groups of letters would be printed on the program sheet and certain of the boxes 40 would be preliminarily punched-out to expose the correct groupings in the desired sequence when moved into position. For example, if the question were to name the 50th State of the Union, the correct answer might appear as shown; the boxes with "X" being closed.

Further, provision is made in this embodiment, which is applicable with equal facility in the other embodiments, for the student to indicate the correctness or incorrectness of his response. Boxes marked with the letters "R, W" are provided under the template for revealing the correct response. Thus, while the response sheet is in the position for observing the correct response, the boxes are overlying the transfer strip. The student may therefore grade his answer which is transferred to the program sheet grade box 20. Further, if desired, the grade boxes may occur in different locations following the boxes for indicating the responses.

In accordance with a preferred embodiment, the transparent plastic or glacine sheet 14 is mounted on the backing to overlay the window. The glacine, for example, may be cemented or heat-sealed to the marginal areas along opposite sides of the window. Further, the glacine is slotted in correspondence with the location of the transfer strips so that the student may write only on those portions of the response sheet which overlay the transfer strips.

It may be desired to utilize the novel teaching device in combination with another form of educational tool such as an audio or visual device. Accordingly, the teaching device is provided with means for controlling automatically the operation of the device. In FIG. 6, the educational tool is shown as a tape recorder 45 having a loudspeaker 46. At predeterminal intervals on the response sheet, e.g., at the conclusion of certain lessons or phases of lessons, the response sheet is provided with button contacts 47, 48 and printed strip 49 to complete the power circuit for the recorder 45, whereupon the recorder is automatically set into operation. Alternatively, the response sheet may be perforated, and the perforations sensed by any suitable sensor for operating the recorder.

While the foregoing description sets forth the principles of the invention in connection with specific apparatus, it is to be understood that this description is made only by way of example and not as a limitation of the scope of the invention as set forth in the objects thereof and in the accompanying claims.

What is claimed is:

1. A teaching device comprising a backing, a program sheet attached to said backing containing stimuli on a first portion thereof and correct responses on a second portion spaced from said first portion, a response sheet of sufficient width to cover said second portion of the program sheet and adapted for movement over said second portion, means attached to said backing for guiding the movement of said response sheet so that the response sheet covers said second portion during movement thereof, a pressure sensitive transfer member located between said response sheet and said second portion, whereby a response to a question indicated by pressure producing means is transferred to said second portion, and said response sheet and transfer member being formed with openings in locations to overlie the correct responses on said second portion when said response sheet is moved into predetermined positions.

2. The device according to claim 1, and further comprising a container for said response sheet attached to said backing and aligned with said second portion, and means for moving said response sheet unidirectionally over said second portion, whereby once a response is indicated the student may not retract the response sheet for alteration thereof.

3. The device according to claim 1, wherein said unidirectional moving means comprises fluting along one edge of said response sheet, and threading said sheet through at least one slot formed in said backing beyond the end of said second portion relative to the travel of said response sheet, the slot being aligned with said second portion and of slightly greater dimensions than the width and thickness of said response sheet, whereby the fluted edge will catch at the end of the slot when an attempt is made to retract the response sheet.

4. The device according to claim 1, wherein said pressure sensitive transfer member comprises transfer surfaces on opposite sides thereof, whereby in addition to the response being transferred to said second portion a mirror image thereof is transferred to the underside of said response sheet, whereby once having indicated his response the student may not later alter his response surreptitiously without producing an inconsistency with the mirror image.

5. The device according to claim 1, wherein said program sheet is attached to said backing towards one end thereof, and said backing being formed with a window towards an end opposite from said one end and elongated in the top to bottom direction of said program sheet, the second portion and window being so located that said correct responses lie under said window, said transfer member comprising a plurality of pressure sensitive transfer strips attached to opposite sides of said window and extending thereacross in predetermined ladder-like distribution, said correct responses on said second portion being spaced from each other alongside the respective stimuli, the spaces between said strips overlying respectively said correct responses, and the strips covering respectively the spaces between said correct responses.

6. The device according to claim 5, wherein said response sheet is movable over said window, and means indicating the location of said strips while said response sheet is movable thereover, whereby a student may indicate his response to a stimulus by applying pressure produced indicia over said strips.

7. The device according to claim 6, and further comprising a transparent member overlying said window and securely mounted to the opposite sides of said window, said transparent member being formed with slots located to overlie said pressure sensitive strips, and said response sheet being guided for movement between said transparent member and said strips.

8. The device according to claim 7, and wherein said transfer member is provided with a plurality of uniformly spaced slots extending intermediate the lateral edges of the sheet, the slots constituting the spaces between said strips, and the sheet material between the slots constituting said strips, and means securing the lateral edges of said sheet to said backing to define said guide means for guiding said response sheet between said elongated sheet and said backing.

9. The device according to claim 8, and further comprising a spring member attached to said elongated sheet along one lateral edge thereof and located to hold under pressure an edge of the second portion of said program sheet.

10. The device according to claim 9, wherein said backing comprises a first coded portion alongside said window, the coded portion indicating the location of said strips, said program sheet comprising a second similar coded portion located so that when the second portion is properly positioned relative to said window the coded portions are aligned, and said response sheet comprising a third similar coded portion and discrete areas alongside said coded portion for receiving a response, whereby a predetermined relationship of said coded portions informs the student of the area into which he may make his response, the location of the strips when under said discrete areas and where the student may find the correct response to the stimulus.

11. A teaching device, comprising a backing, a program sheet attached to said backing towards one end thereof containing stimuli on a first portion thereof orderly arranged in discrete sections from the top to the bottom of the sheet and correct responses on a second portion spaced from said first portion, the correct responses also being spaced from each other to provide room for a student's response to the respective stimuli, the correct responses and the spaces therebetween being orderly arranged alongside the respective associated stimuli, said backing being formed with a window towards an end opposite from said one end and elongated in the top to bottom direction of said sheet, the backing also including a slot between said ends through which the second portion of said sheet passes, the second portion of said sheet and the slot and window being so located that said correct responses lie under said window, a plurality of pressure sensitive transfer strips attached to opposite sides of said window and extending thereacross in predetermined ladder-like distribution, the strips covering respectively the spaces between said correct responses, and the spaces between said strips overlying respectively said correct responses, a movable response sheet covering said window, guide means attached to said backing for guiding movement of said response sheet over said window, means indicating the location of said strips while said response sheet is movable thereover, whereby a student may indicate his response to a stimulus by applying pressure produced indicia to said response sheet over said strips, the indicia being thereby transferred to said program sheet, and said response sheet being provided with discretely spaced openings adapted to register with said correct responses when the response sheet is moved into predetermined positions, whereby after the student indicates his response to a stimulus he may observe the correct response.

12. The device according to claim 11, and further comprising a container for said response sheet attached to said backing and aligned with said window, and means for moving said response sheet unidirectionally over said window, whereby once a response is indicated the student may not retract the response sheet for alteration thereof.

13. The device according to claim 12, wherein said unidirectional moving means comprises fluting along one edge of said response sheet, and threading said sheet through at least one slot formed in said backing at the egress end of said window, the slot being aligned with said window and of slightly greater dimensions than the width and thickness of said response sheet, whereby the fluted edge will catch at the end of the slot when an attempt is made to retract the response sheet.

14. The device according to claim 11, wherein said unidirectional moving means comprises a take-up roller rotatable in one direction only.

15. The device according to claim 11, and further comprising a transparent member overlying said window and securely mounted to the opposite sides of said window, said transparent member being formed with slots located to overlie said pressure sensitive strips, and said response sheet being guided for movement between said transparent member and said strips.

16. The device according to claim 15, and further comprising an elongated sheet provided with a plurality of uniformly spaced slots extending intermediate the lateral edges of the sheet, the slots constituting the spaces between said strips, and the sheet material between the slots constituting said strips, and means securing the lateral edges of said sheet to said backing to define said guide means for guiding said response sheet between said elongated sheet and said backing.

17. The device according to claim 16, and further comprising a spring member attached to said elongated sheet along one lateral edge thereof and located to hold under pressure an edge of the second portion of said program sheet.

18. The device according to claim 17, wherein said spring member comprises a lateral edge of said elongated sheet folded back on itself a given distance and then perpendicular thereto a given distance and then downwardly against said program sheet.

19. The device according to claim 11, wherein said backing comprises a first coded portion alongside said window, the coded portion indicating the location of said strips, said program sheet comprising a second similar coded portion located so that when the second portion is properly positioned relative to said window the coded portions are aligned, and said response sheet comprising a third similar coded portion and discrete areas alongside said coded portion for receiving a response, whereby a predetermined relationship of said coded portions informs the student of the area into which he may make his response, the location of the strips when under said discrete areas and where the student may find the correct response to the stimulus.

20. The device according to claim 11, wherein said transfer strips comprise transfer surfaces on opposite sides thereof, whereby when a student indicates his response by applying pressure produced indicia to the response sheet over any one of said strips, a mirror image of the indicia is transferred to the underside of said response sheet, whereby once having indicated his response the student may not later alter his response surreptitiously without producing an inconsistency with the mirror image.

21. The device according to claim 11, wherein said response sheet further comprises means for closing an electrical circuit, and an educational device responsive to the closing of said electrical circuit for augmenting the information which the student receives from the teaching device.

References Cited in the file of this patent

UNITED STATES PATENTS

| | | |
|---|---|---|
| 1,705,657 | Clapp | Mar. 19, 1929 |
| 2,560,130 | Russo | July 10, 1951 |
| 2,789,370 | Studebaker | Apr. 23, 1957 |
| 2,836,433 | Dolan | May 27, 1958 |

OTHER REFERENCES

"Machine Is Teacher" (article), Washington Post and Times Herald (newspaper), Sec. B, page 2—March 6, 1959.